(12) United States Patent
Roeglin et al.

(10) Patent No.: US 10,486,567 B2
(45) Date of Patent: Nov. 26, 2019

(54) ARM REST AND HINGE ASSEMBLY

(71) Applicant: Shrock Manufacturing, Inc., Elkhart, IN (US)

(72) Inventors: Timothy J. Roeglin, Elkhart, IN (US); Scott J. Shrock, Granger, IN (US)

( * ) Notice: Subject to any disclaimer, the term of this patent is extended or adjusted under 35 U.S.C. 154(b) by 219 days.

(21) Appl. No.: 15/804,435

(22) Filed: Nov. 6, 2017

(65) Prior Publication Data
US 2019/0135144 A1    May 9, 2019

(51) Int. Cl.
| | |
|---|---|
| *B60N 2/70* | (2006.01) |
| *B60N 2/75* | (2018.01) |
| *B60N 2/22* | (2006.01) |
| *B60N 2/90* | (2018.01) |

(52) U.S. Cl.
CPC ............ *B60N 2/77* (2018.02); *B60N 2/22* (2013.01); *B60N 2/767* (2018.02); *B60N 2/787* (2018.02); *B60N 2002/948* (2018.02)

(58) Field of Classification Search
CPC .......... B60N 2/77; B60N 2/787; B60N 2/767; B60N 2/763; B60N 2/75; B60N 2/22; B60N 2/464; B60N 2/4673; B60N 2002/948
USPC .......................................... 297/411.26, 411.2
See application file for complete search history.

(56) References Cited

U.S. PATENT DOCUMENTS

| | | | |
|---|---|---|---|
| 4,881,778 A | 11/1989 | Stephenson et al. | |
| 4,968,095 A | 11/1990 | Moyer | |
| 4,978,170 A | 12/1990 | Pelz et al. | |
| 5,720,525 A * | 2/1998 | Rumler ................. | B60N 2/753 297/411.32 |
| 6,361,114 B1 | 3/2002 | Rumler | |
| 8,328,286 B2 | 12/2012 | Steury et al. | |
| 8,480,172 B2 | 7/2013 | Baker et al. | |
| 8,967,722 B2 | 3/2015 | Neterer et al. | |
| 9,016,793 B2 | 4/2015 | Roeglin et al. | |
| 9,108,549 B2 | 8/2015 | Thurow | |
| 9,376,041 B2 | 6/2016 | Steury | |
| 2014/0225410 A1* | 8/2014 | Thurow .................. | B60N 2/22 297/359 |

* cited by examiner

*Primary Examiner* — Mark R Wendell
(74) *Attorney, Agent, or Firm* — Botkin & Hall, LLP

(57) ABSTRACT

A hinge and armrest assembly is provided with a stationary portion and a reclining portion. The stationary portion is affixed to a seat bottom and the reclining portion is affixed to a seat back. A link is coupled to the fixed portion on one end and a rotating cage on the opposite end. The rotating cage is located and overlays an armrest receiving portion on the reclining portion. An armrest has a pin that extends through the armrest receiving portion and rotating cage. As the reclining portion rotates with respect to the stationary portion, the rotating cage rotates to maintain the angle of the armrest to the fixed portion.

20 Claims, 13 Drawing Sheets

ARM REST AND HINGE ASSEMBLY

BACKGROUND OF THE INVENTION

This present disclosure relates to reclining seats, hinges, and armrests. Reclining seats are commonplace in homes and vehicles and many of them have armrests. When the armrest is integral or attached to the seat bottom, the person using the recliner can comfortably rest their arms, regardless of the seat back angle. In many vehicles, the application requires the seat back to carry the armrest. In this situation, reclining the seat would either leave the armrest at an awkward angle as the seat back reclines, or a mechanism that links the armrest angle to the seat bottom to maintain the angle with respect to the bottom as the back reclines. Many designs attempt to accomplish this task, but each solution is fraught with issues, such as a complex mechanism, or the design is susceptible to manufacturing variations that create a difference in the angle of one armrest compared to the other. Other attempts to solve this problem involve a series of independently positionable components that must be precisely aligned for proper fitment. An improved design is needed.

SUMMARY OF THE INVENTION

The present disclosure describes an integral hinge assembly that can receive an armrest that is simple to assemble without precise positioning for proper operation. The hinge assembly is designed to be attached between a seat bottom and a seat back to form the reclining mechanism. The reclining mechanism positions all necessary components that set up necessary geometry and maintains the angle of the armrest as the seat back reclines. The spacing does not have to be exactly equal, but deviation from the distances would result in reclining of the seat back with respect to the seat bottom would result in the armrest not moving in unison and deviating from being parallel to the seat bottom.

A seat has a seat bottom, a seat back, and at least one hinge assembly. The hinge assembly has a fixed portion connected to the pivoting portion and can rotate with respect to the fixed portion about a reclining axis. The fixed portion is attached to the seat bottom and the pivoting portion is attached to the seat back. The fixed portion has a linkage pin that is spaced from the reclining axis and a stop pin that is spaced from the reclining axis. The pivoting portion has a lower planar portion extending to an upper planar portion, the lower planar portion has an arcuate notch, the stop pin and the arcuate notch cooperate to constrain the rotation of the pivoting portion with respect to the fixed portion. The upper planar portion has an armrest receiver portion. The armrest receiver portion has a first wall that extends from the upper planar portion. The first wall of the armrest receiver portion has a transverse wall that extends to a second wall with the first wall being parallel to the second wall. The first wall has a keyhole aperture and the second wall has a pin aperture and the keyhole and pin apertures align to form an armrest axis. A rotating cage has a first cage wall has a first cage aperture and a second cage wall has a second cage aperture. The rotating cage has top and front cage walls attached between the first and the second cage walls and the cage apertures align to form a cage axis. The front cage wall has two stop apertures. An elongate link connects the linkage pin at a first end to the rotating cage at a second end. A removable armrest has an elongate portion and an armrest pin extending therefrom, the armrest pin adapted to be received by the cage apertures and the keyhole aperture and the pin aperture to couple the rotating cage to the pivoting portion.

BRIEF DESCRIPTION OF THE DRAWINGS

A preferred embodiment of this invention has been chosen wherein.

DESCRIPTION OF THE PREFERRED EMBODIMENT

Figure 1:
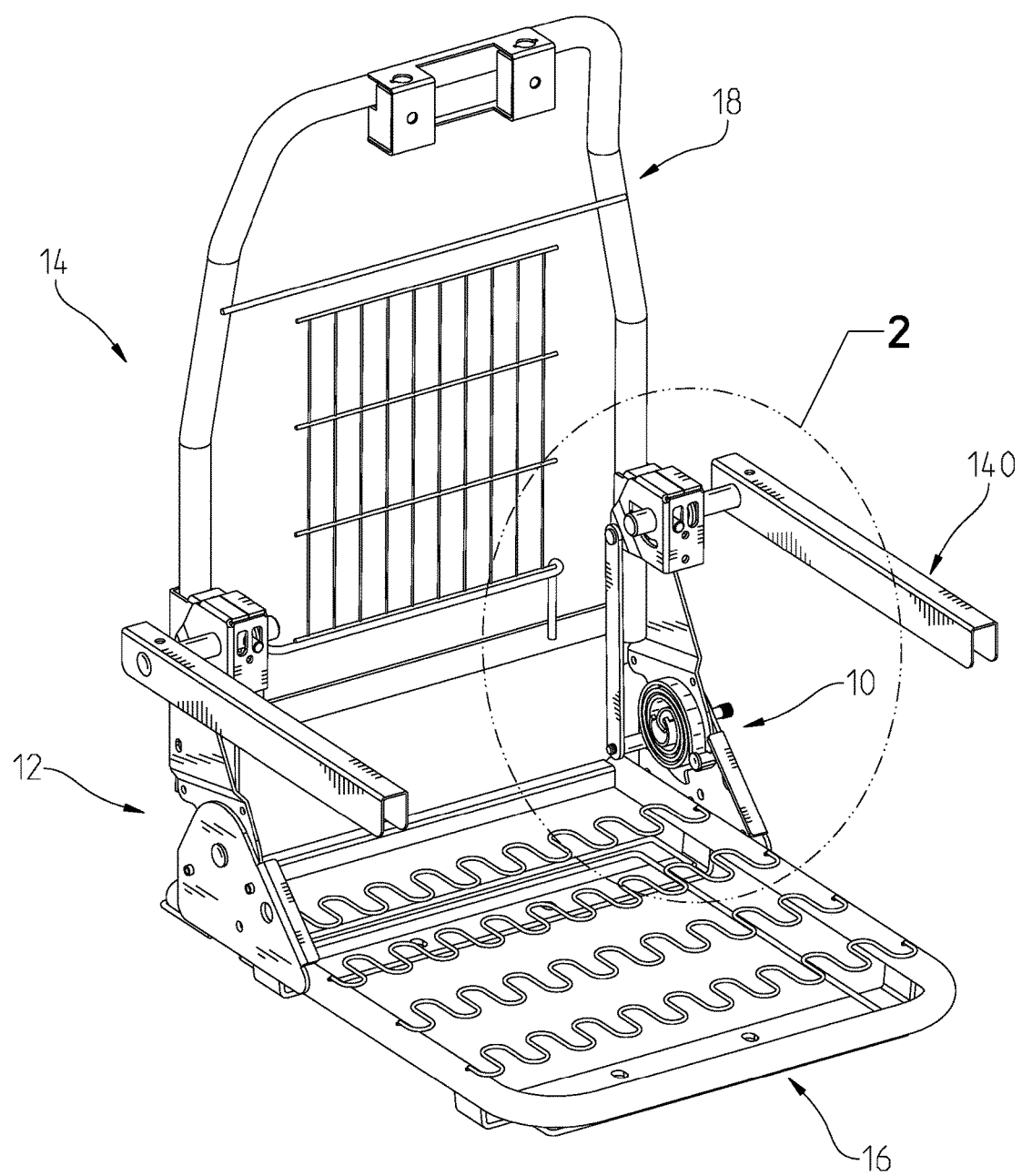
FIG. 1 is an isometric view of the hinge assembly as installed on a seat frame.
Figure 2:
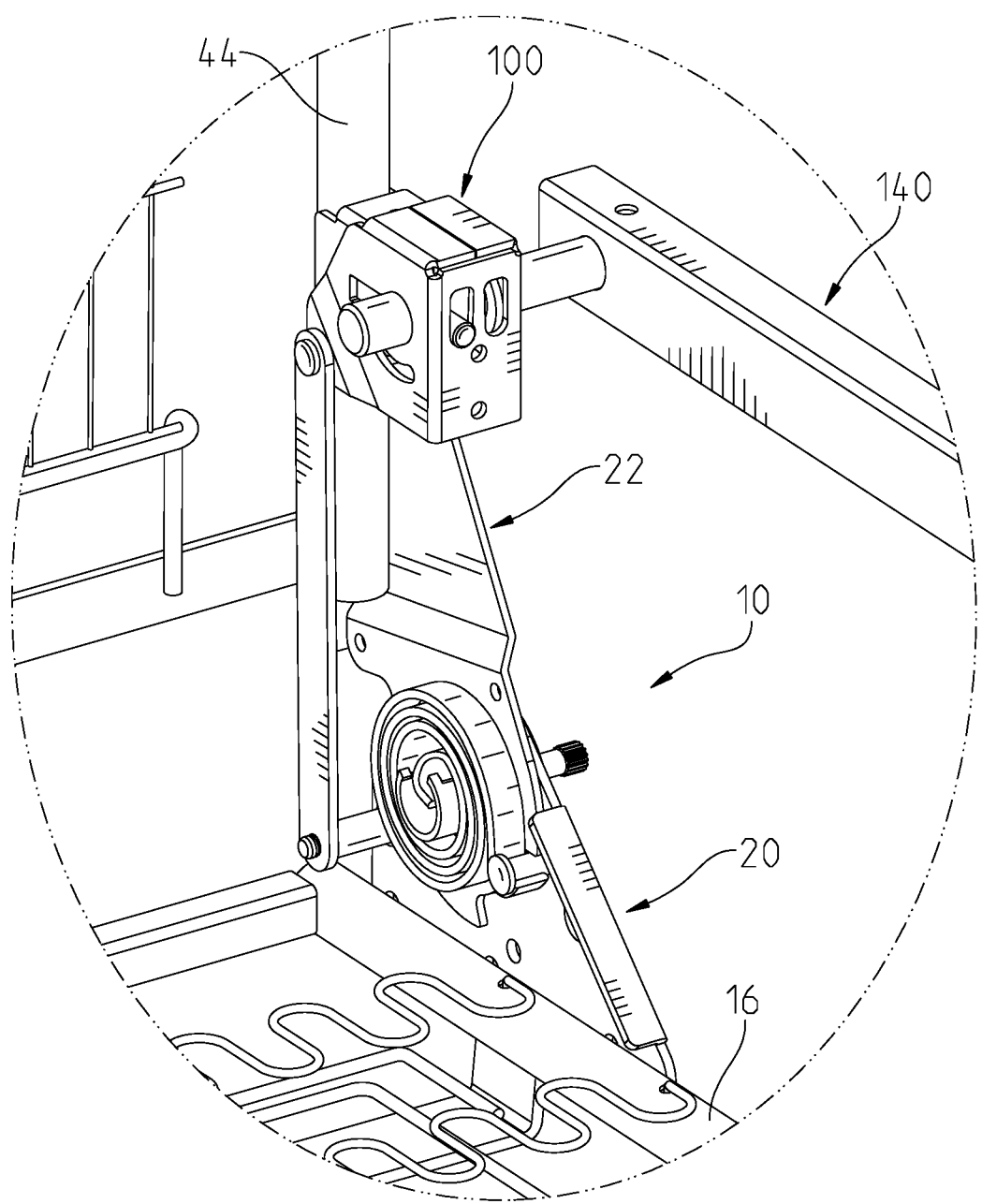
FIG. 2 is a partial isometric view 2 of the hinge assembly as installed on a seat frame.

An armrest and hinge assembly 10, 12 is shown affixed to a seat 14 in FIG. 1. The hinge assembly 10, 12 can include locking and spring return features as shown in assembly 10. The hinge assemblies 10, 12 are affixed to a seat bottom 16 and a seat back 18. As shown, the locking style assembly 10 is located on one side, and the freely moving assembly 12 is located on the opposite side. The two hinge assemblies 10, 12 are fixed with respect to each other through their affixation to the seat bottom 16 and seat back 18. The locking style assembly 10 has the same basic structure as the freely moving assembly 12 but the locking style assembly 10 has additional components that are described hereinafter. The hinge assemblies 10, 12 each have a fixed portion 20 and a pivoting portion 22. The embodiment shown herein is a manually reclined seat, but motorized versions are contemplated.

Figure 3:
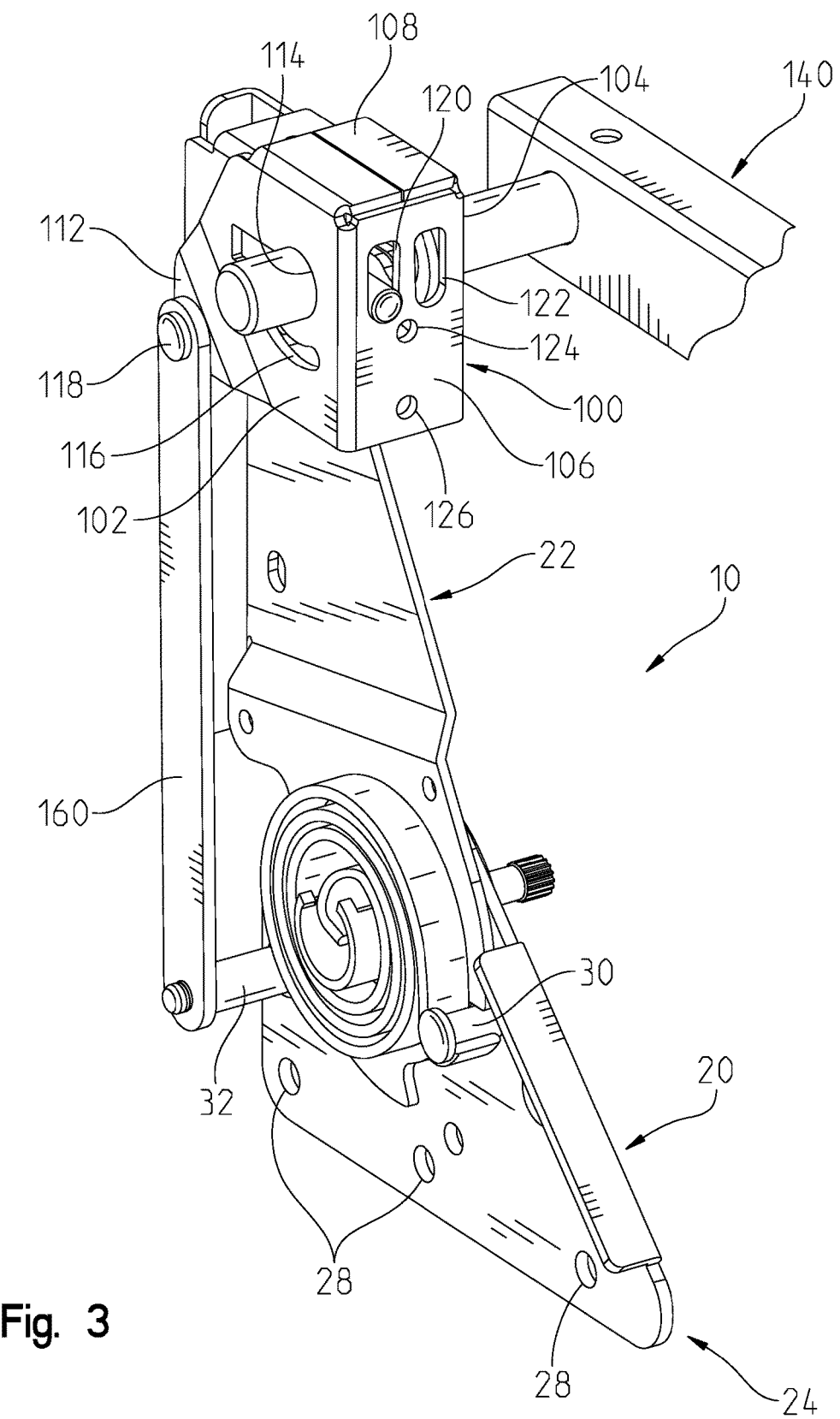
FIG. 3 is an isometric view of the hinge assembly.
Figure 4:
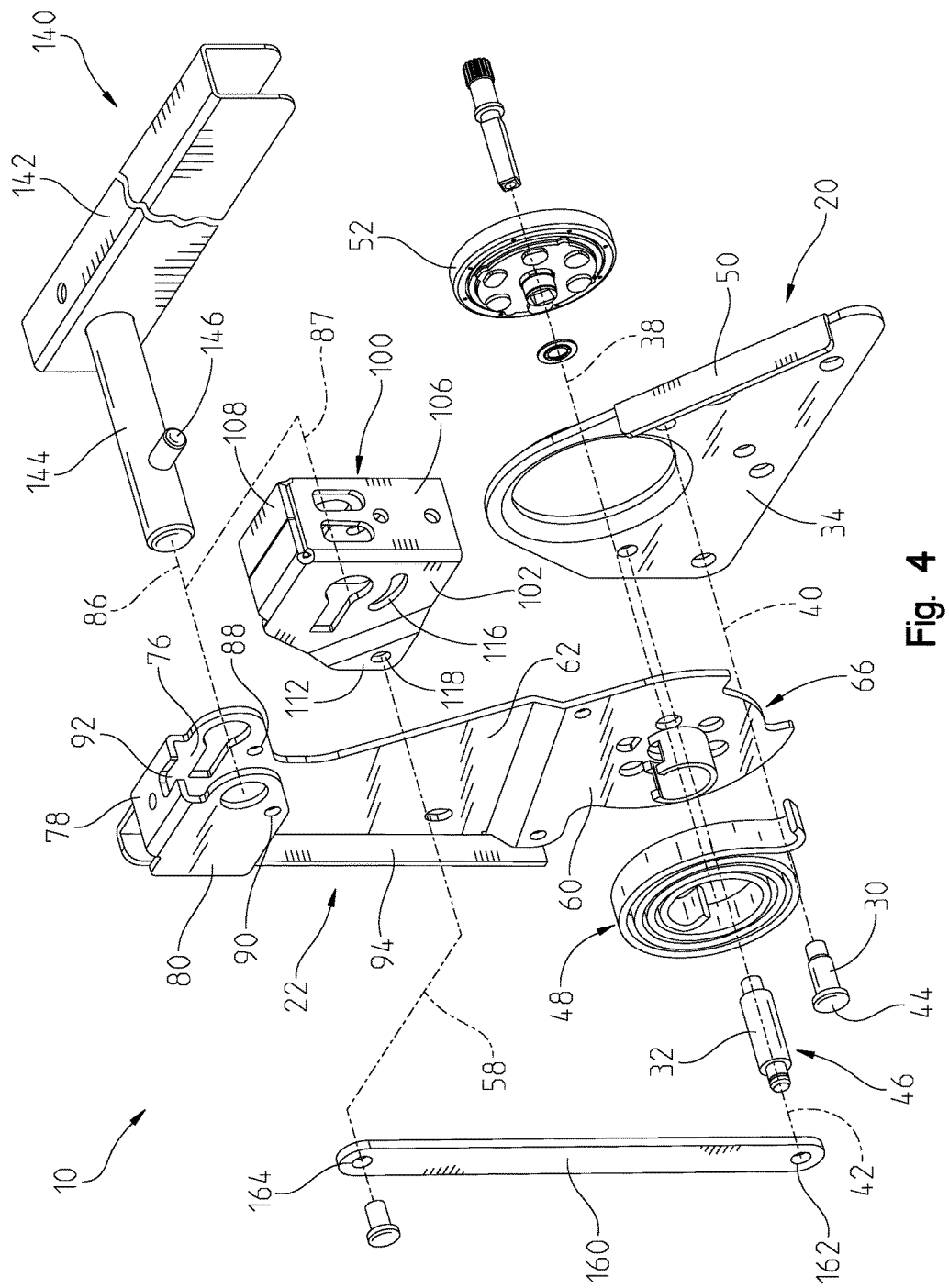
FIG. 4 is an exploded isometric view of the hinge assembly in FIG. 3.
Figure 5:
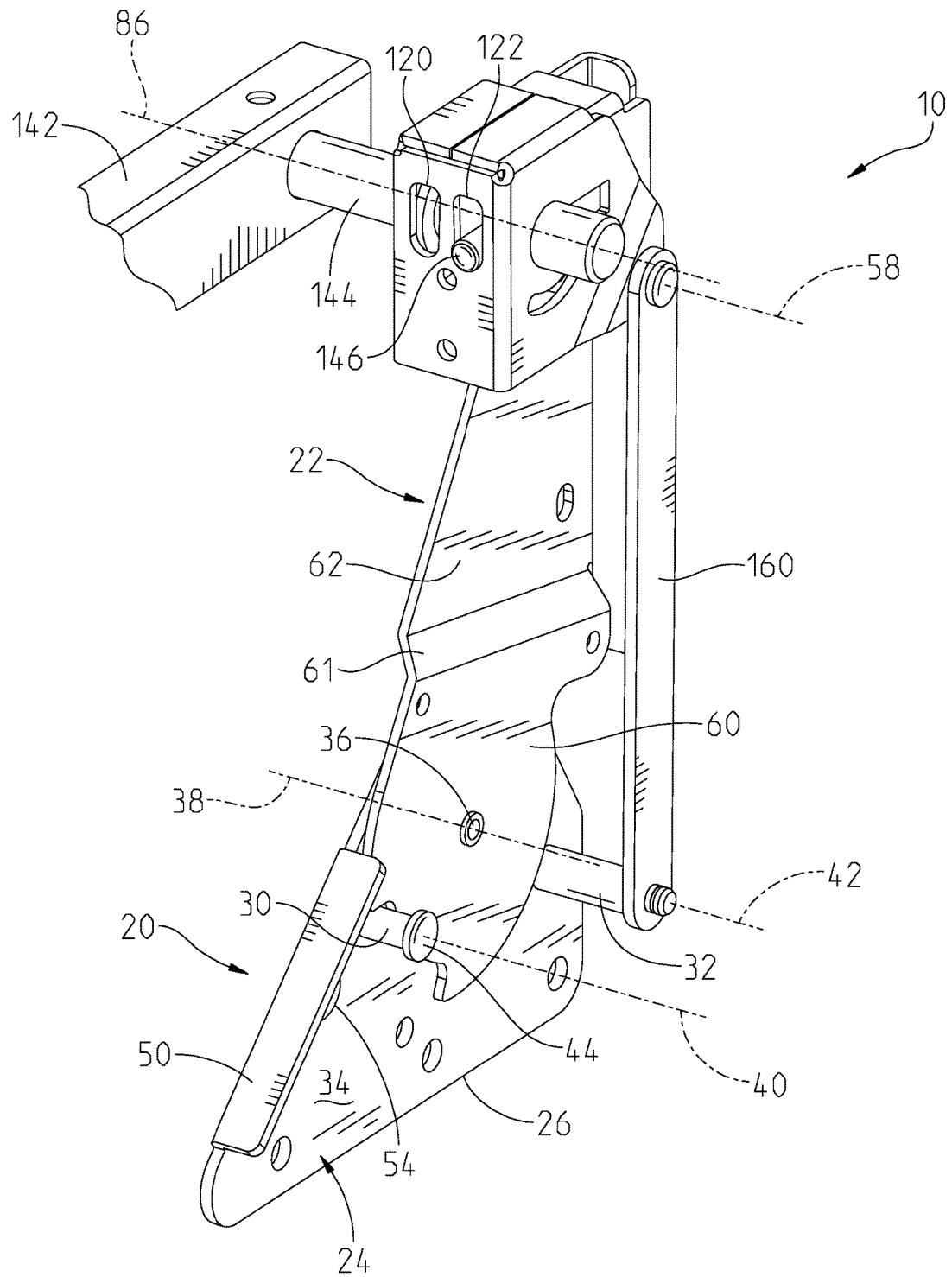
FIG. 5 is an isometric view of the hinge assembly.

The fixed portion 20 has a seat bottom mounting area 24 near a bottom lateral edge 26. The fixed portion 20 is shown as a planar structure that is commonly stamped from a sheet of material, such as sheet steel. The bottom mounting area 24 has a series of holes 28 that can be used to weld, rivet, or bolt the fixed portion 20 to the seat bottom 16. The fixed portion 20 further includes a stop pin 30 and a linkage pin 32. Both pins 30, 32 extend from the inside surface 34 of the fixed portion 20. A pivot point 36 is located on a pivot axis 38. The pivot point may be a simple pivot pin, such as is shown in FIG. 5 or a locking mechanism 37 as is shown in FIG. 3-4. The stop pin 30 has an axis 40 that is parallel to the pivot axis 38, shown in FIG. 4. The stop pin 30 further includes a head 44 that is larger than the body. The linkage pin 32 has an offset portion 46 and a has an axis 42 that is parallel to and spaced from the pivot axis 38. The stop pin 30 and linkage pin 32 are shown permanently affixed to the fixed portion 20 through riveting, but other joining and affixing types may be used that may include threading or welding. A spring 48 may be used to assist the reclining mechanism 52 as it moves the pivoting portion 22 between the reclined and the upright position. A folded portion 50, shown in FIG. 4, is located on the front facing area of the fixed portion 20 to reduce the chances of any fabric getting cut or user discomfort from a sharp edge. The fixed portion 20 further may include a restraint mount aperture 54, shown in FIG. 5, that provides a mounting point for a seat belt.

Figure 6:
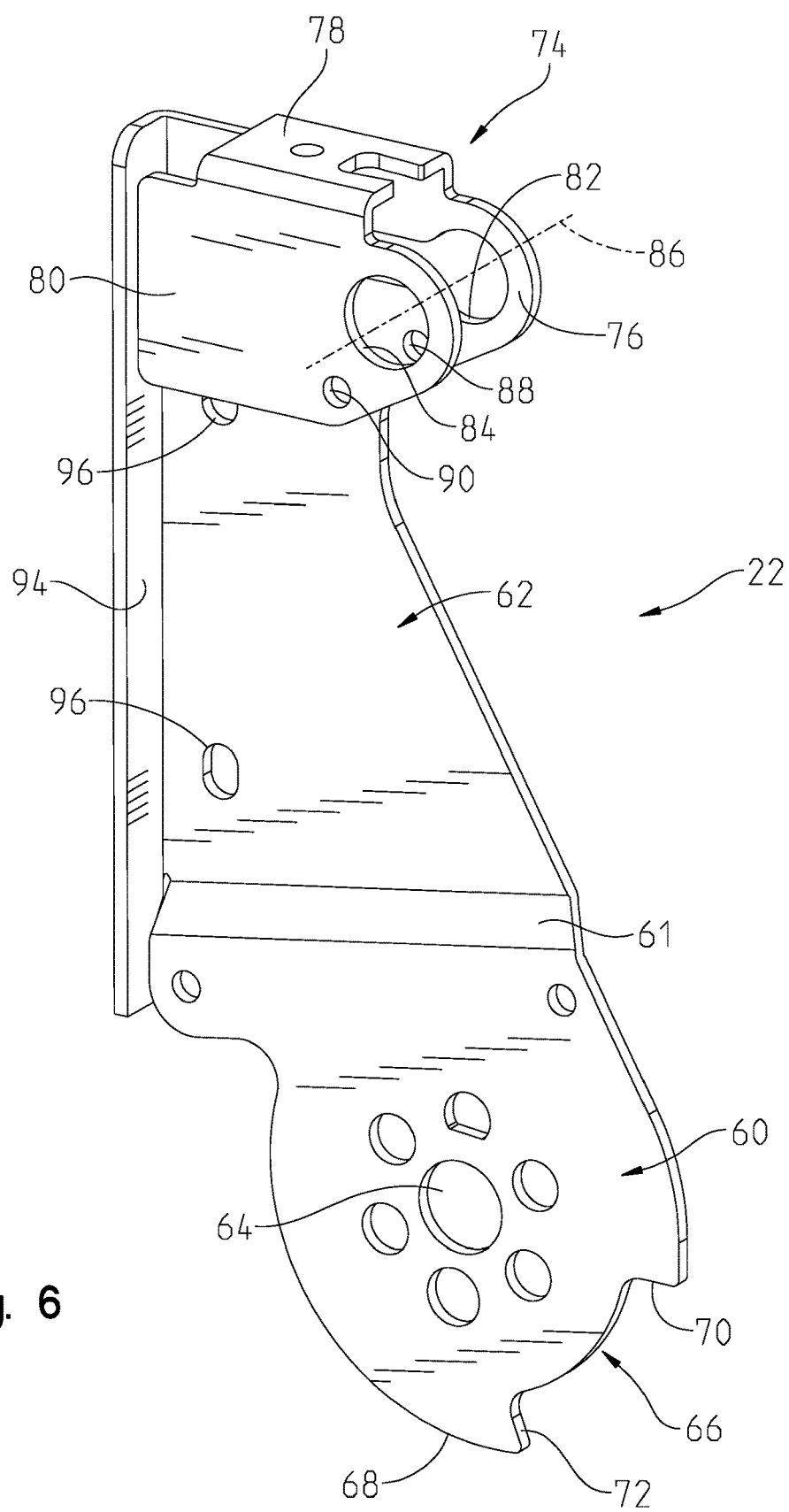
FIG. 6 is a side isometric view of the pivoting portion of the hinge assembly.
Figure 7:
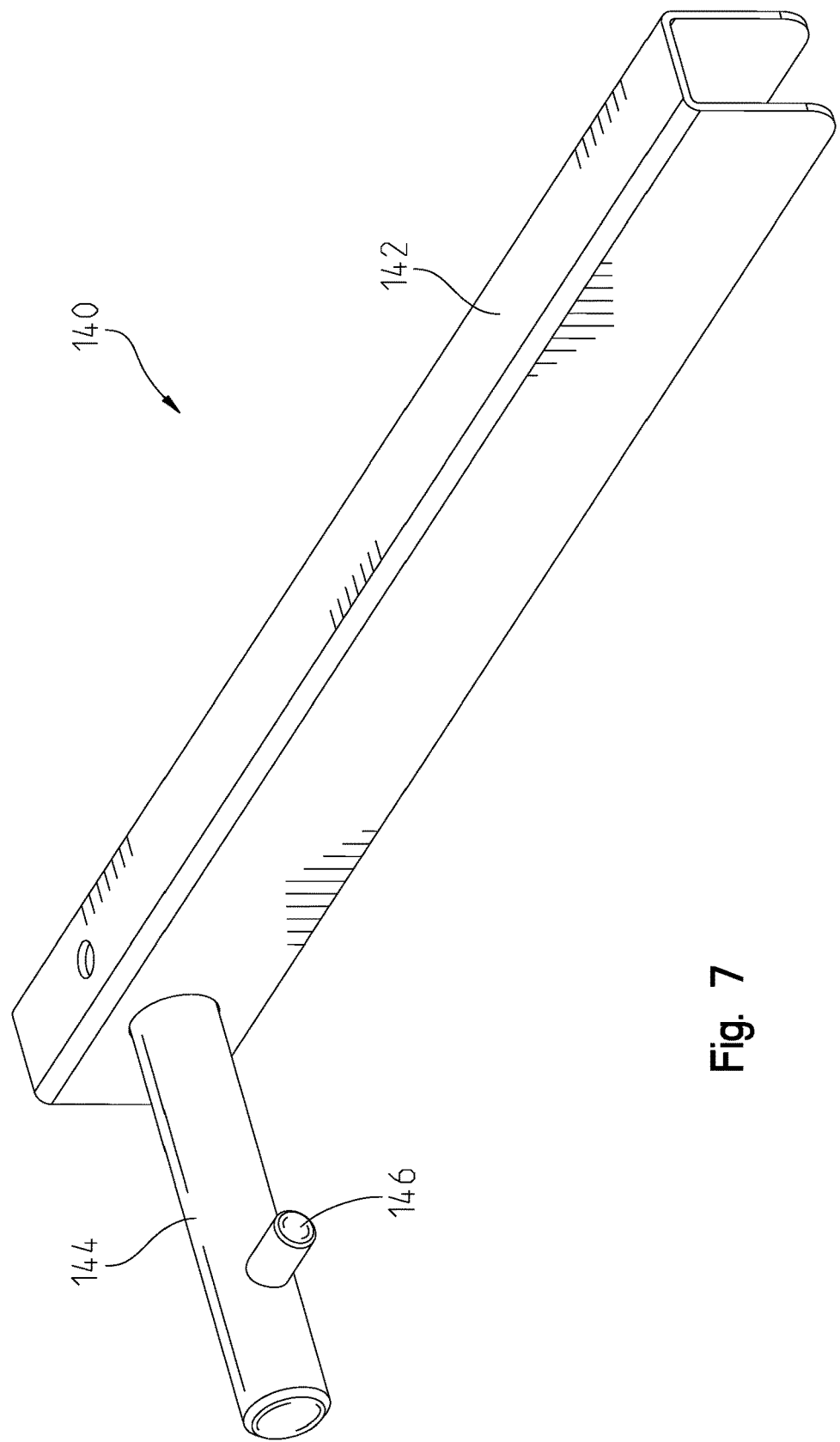
FIG. 7 is an isometric view of the armrest.
Figure 9:
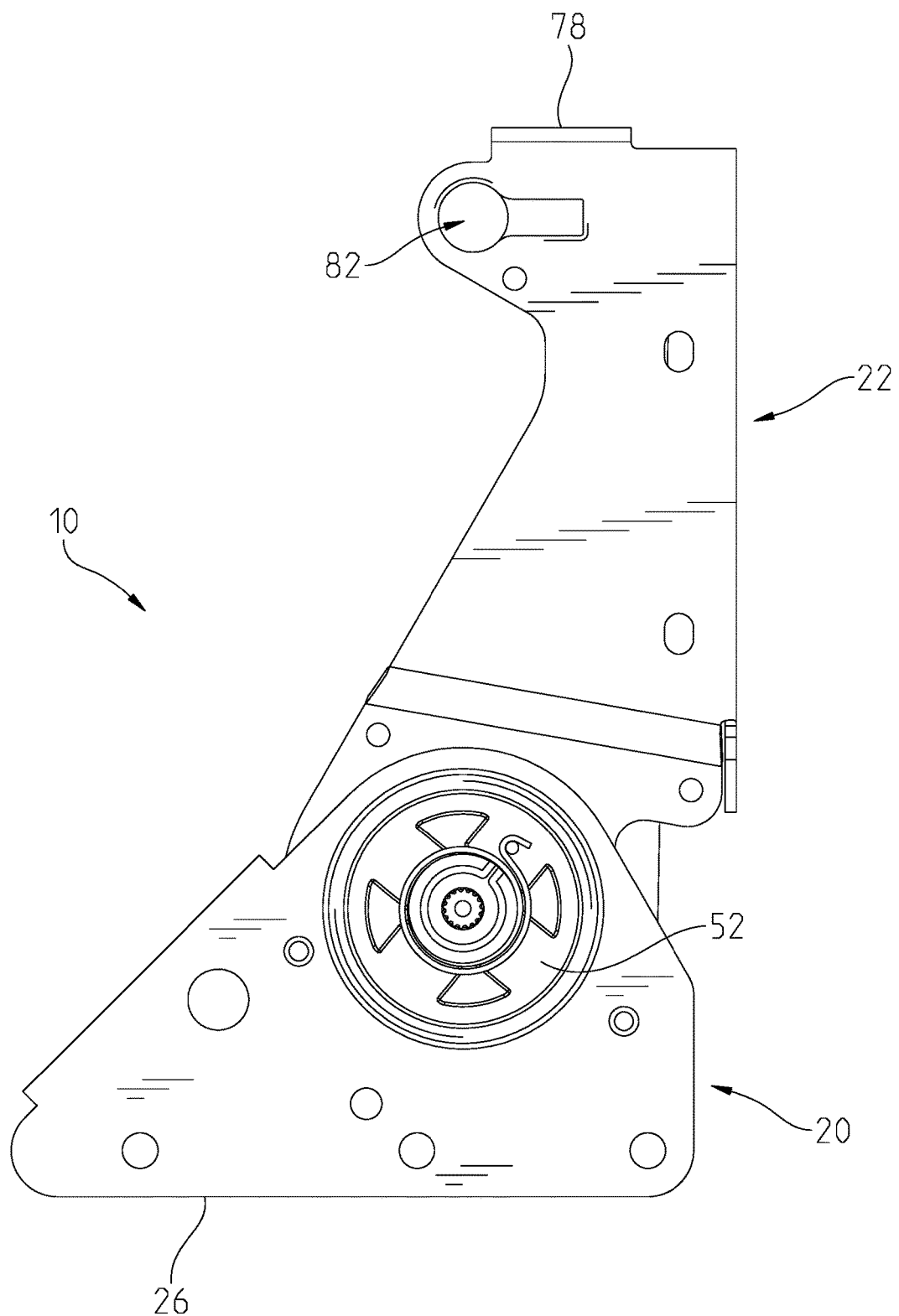
FIG. 9 is a side view of the hinge assembly.

The pivoting portion 22, shown in FIG. 6 is formed from a sheet of rigid material, such as sheet steel, with a lower portion 60 that extends to an upper portion 62 through an angled wall portion 61. The lower portion 60 is shown as in an offset plane from the upper portion 62. The angled wall portion 61 allows the upper portion 62 to be coplanar or close to coplanar with the fixed portion 20 when the pivoting portion 22 is mated with the fixed portion 20. The lower portion 60 has an aperture 64 that, as assembled to the fixed portion 20, is located on the pivot axis 38. The lower portion 60 further includes an arcuate notch 66 that is recessed from an outer edge 68. The outer edge 68 is located at a greater distance than the arcuate notch 66. The stop pin 30 is located in the arcuate notch 66 as assembled. The stop surfaces 70, 72 limit the rotation of the pivoting portion 22 by contacting the stop pin 30. The upright position and reclined position of the seat 14 is controlled by the location of and the angular distance between the stop surfaces 70, 72. Near the top of the upper portion 62 is an armrest receiving portion 74. The armrest receiving portion has a first wall 76, a top wall 78, and a second wall 80. The first wall 76 is parallel to the second wall 80, with the top wall 78 extending between the two. The top wall 78 is perpendicular to the first and second walls 76, 80. The first wall 76 has a keyhole aperture 82 that is aligned with an aperture 84 located on the second wall 80 to form an arm axis 86. The keyhole feature is located only on the first wall, which is nearest the outside once assembled to the seat. The keyhole, as shown in FIGS. 6 and 9, faces and is perpendicular to the seat back mounting wall 94. Located adjacent the apertures 82, 84 are shaft receiving holes 88, 90. The top wall 78 has a centrally located notch 92. The pivoting portion 22 includes a seat back mounting wall 94. Adjacent the seat back mounting wall 94 are mounting apertures 96. The seat back mounting wall 94 serves as a reference and support wall when the seat back is installed. The mounting apertures 96 allow for fasteners or welding to be used to affix the hinge assembly 10, 12 to the seat back. Located adjacent the angled wall portion 61 are mounting apertures 98 to mount an electric motor that can move the pivoting portion 22 between the reclined position and upright position.

Figure 8:
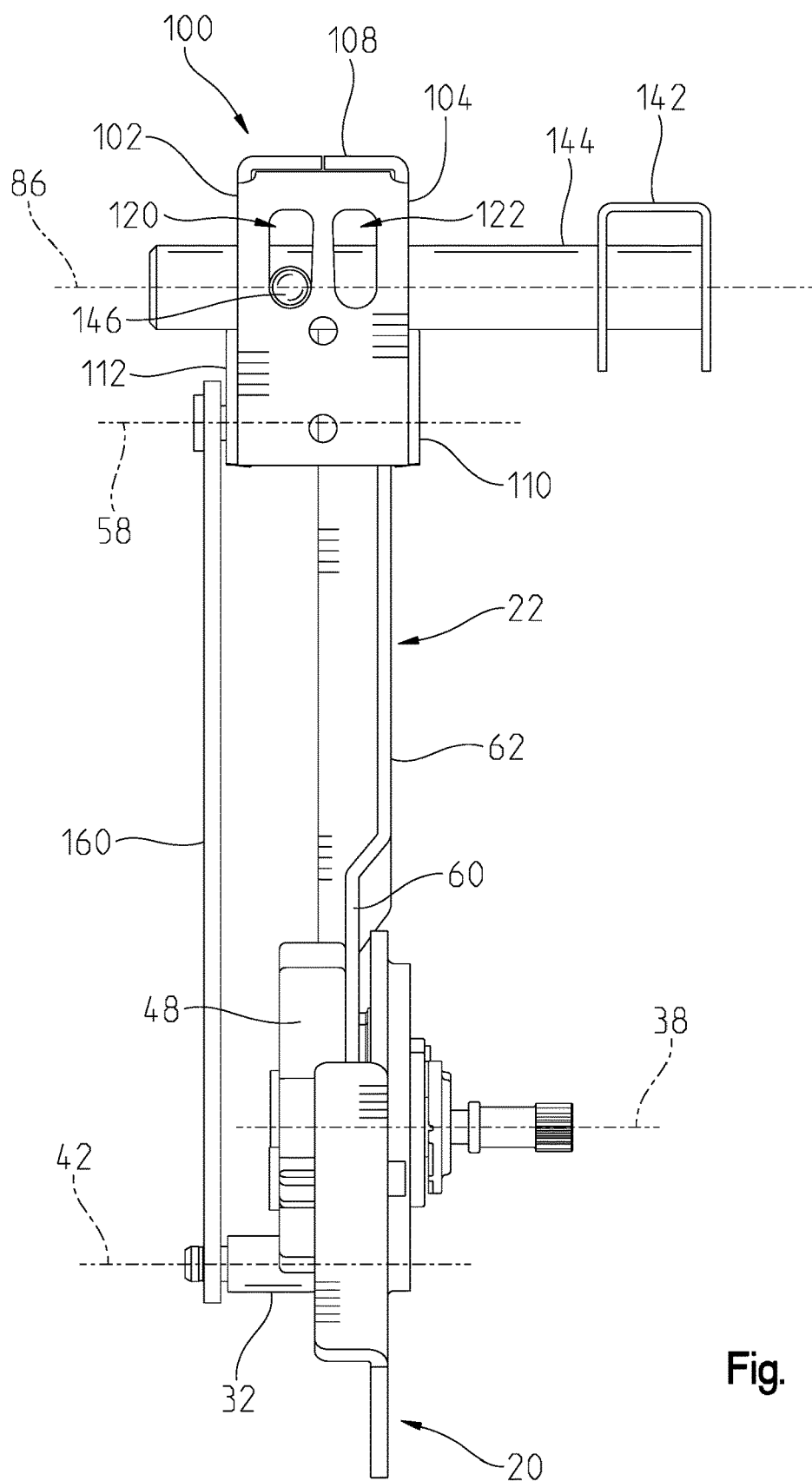
FIG. 8 is a front view of the hinge assembly.

A rotating cage 100, shown in FIG. 4, is a four-sided component that fits over the armrest receiving portion 74. The rotating cage 100 is commonly formed from a stamped and formed sheet of material, such as steel, and has a first sidewall 102, a second sidewall 104, a front wall 106, and a top wall 108. To provide structural support and to add rigidity, the walls are joined. The first and second sidewalls 102, 104 are parallel to each other, with the front wall 106 and top wall 108 extending between them. The front and top walls 106, 108 are perpendicular to each other and to the sidewalls 102, 104. The rotating cage 100 is mirror symmetrical about a central plane that intersects the front and top walls 106, 108. The first sidewall 102 has an offset portion 110 and the second sidewall 104 has an identical offset portion 112. Each sidewall 102, 104 further includes a keyhole aperture 114, an arcuate channel 116, and an aperture 118. The keyhole apertures 114 align to form a cage axis, shown on FIG. 4. The apertures 118 are located on an axis 58, shown on FIGS. 4 and 8 and are spaced from the cage axis by a distance equal or nearly equal to the distance between axes 42 and 38. The front wall 106 has a pair of parallel channels 120, 122 extending through. Located below the parallel channels 120, 122 is an upper hole 124 and a lower hole 126. The arcuate channel 116 is aligned with a corresponding shaft receiving hole 88, 90 when the rotating cage 100 is installed over the armrest receiving portion and axis 86 is aligned. This allows a pin or other device to be inserted through both to limit the rotational movement of the rotating cage 100.

Separate from the hinge assembly 10, 12 is a removable arm 140. The arm 140 has an elongate armrest portion 142 and a pin 144 that extends outwardly from the armrest portion 142. The pin 144 is commonly a solid cylindrical component with an outside diameter that is sized to be received by the apertures 82, 84, and 114. The pin 144 has a stop pin 146 that extends perpendicularly therefrom and has a width that is sized to be received by the keyhole aperture 82 and apertures 114. The stop pin 146 is parallel to armrest portion 142.

The assembly 10, 12 each includes a link 160 that has a first link aperture 162 and a second link aperture 164. As shown, the link 160 is a straight rigid member, but the link 160 may take other forms, depending on any components, obstructions, or seat features that require a different shape.

Figure 10:
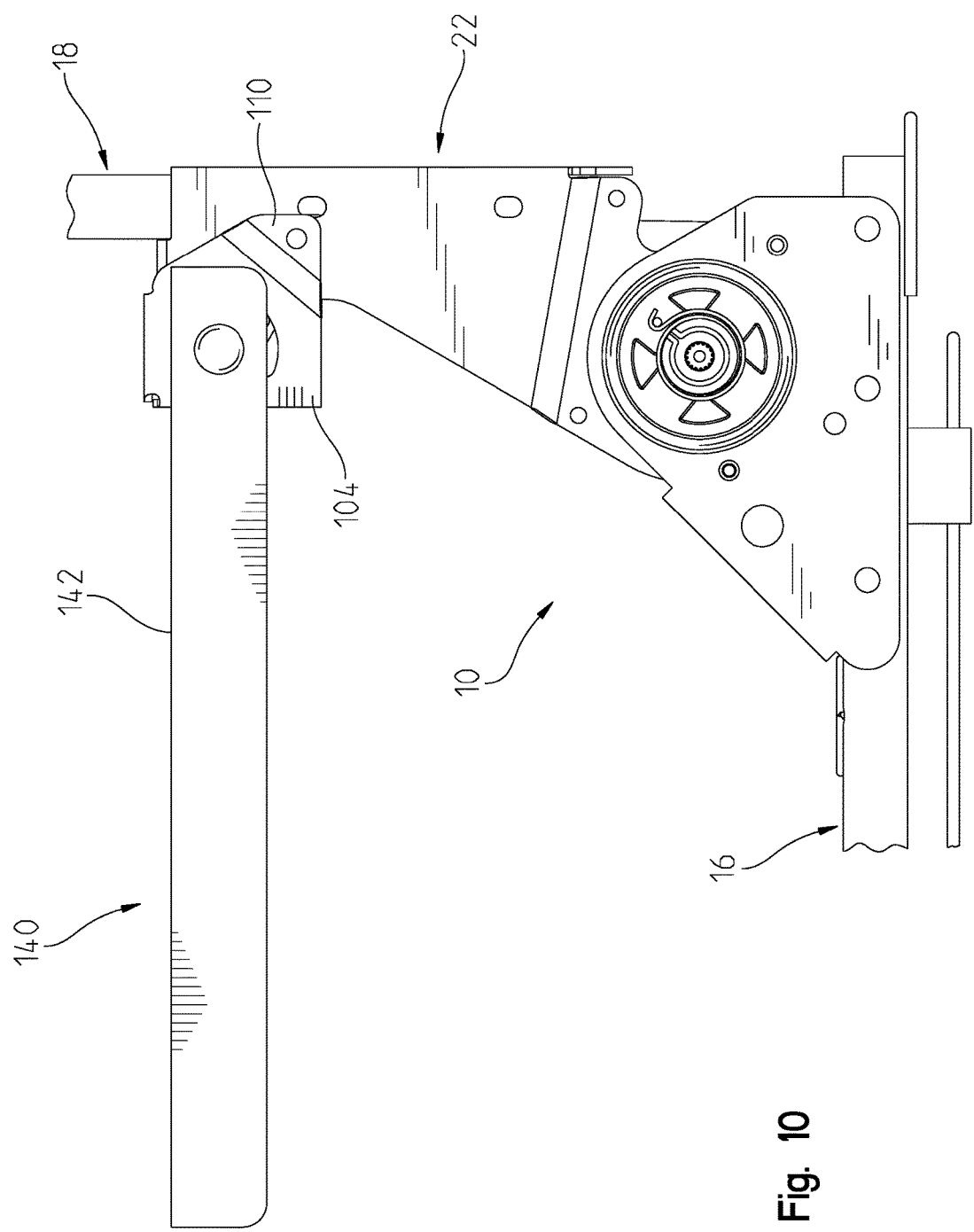
FIG. 10 is a partial outside view of the hinge assembly with the armrest installed and in the upright position.
Figure 11:
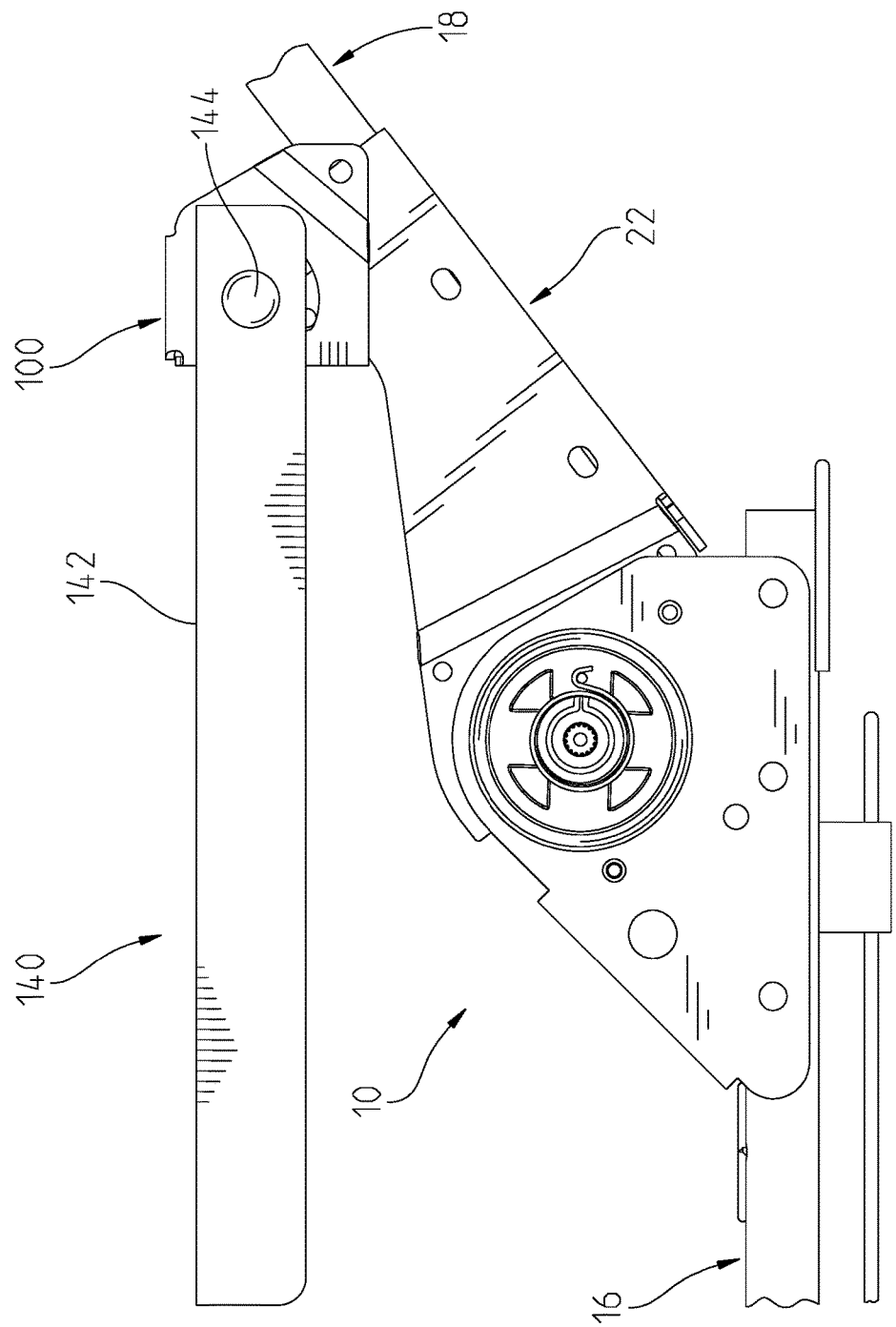
FIG. 11 is a partial outside view of the hinge assembly with the armrest installed and in the reclined position.
Figure 12:
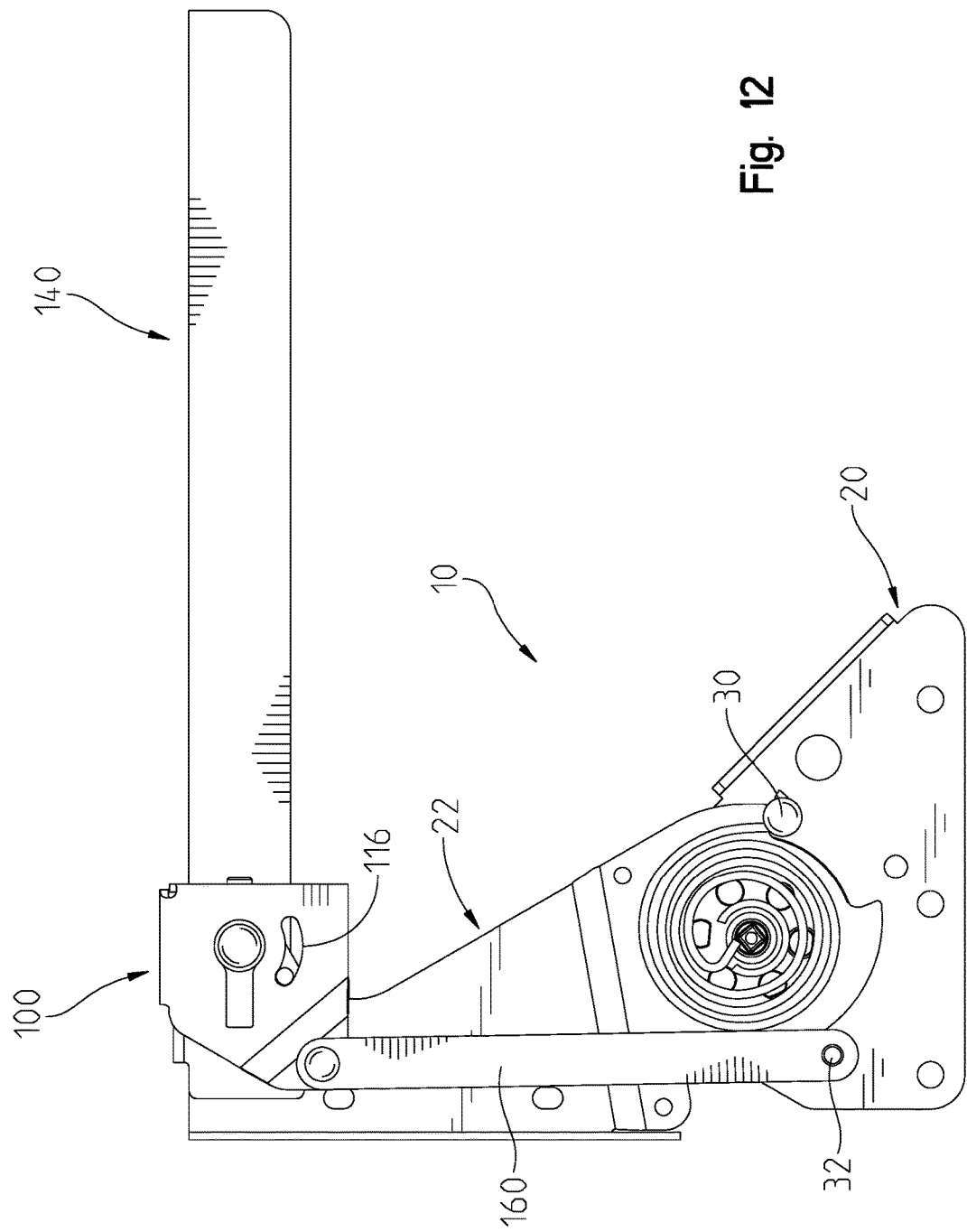
FIG. 12 is an inside view of the hinge assembly in FIG. 10.
Figure 13:
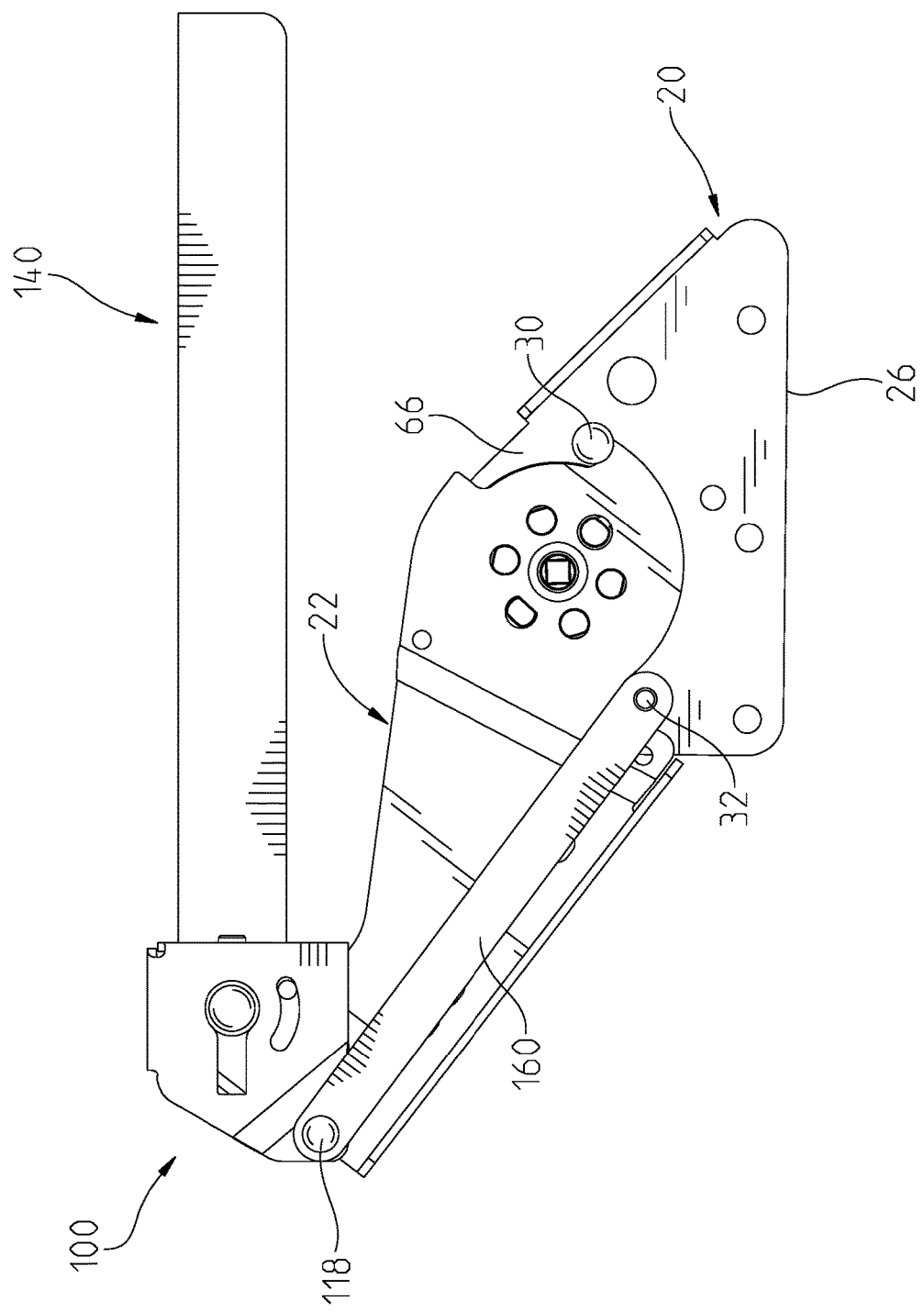
FIG. 13 is an inside view of the hinge assembly in FIG. 11.

To assemble the armrest 140, the rotating cage 100 is installed over the armrest receiving portion to align axis 86 and the apertures 82, 84 with apertures 114. The rotating cage must be angularly positioned to align the keyhole shapes to allow the stop pin 146 to pass through as the pin 144 is inserted through. At that point, the armrest is pointing oppositely or nearly oppositely as it would be used. The armrest 140 is then rotated forward where the stop pin 146 passes through the notch 92. The armrest 140 is then rotated and moved axially to align the stop pin 146 to parallel channels 120, 122. The notch 92, as shown in the FIGS., is not aligned with the parallel channels 120, 122 to prevent accidental removal of the armrest 140 when the user pivots it rearward. When the stop pin 146 is contacting the bottom portion of the corresponding channel 120, 122, shown in FIG. 8, the arm rest 140 is coupled to the fixed portion and will move as shown in FIGS. 10-11.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A seating hinge and armrest assembly adapted to be affixed to a seat having a bottom and a back, said assembly comprising:

a fixed portion connected to a pivoting portion at a pivot point located on a reclining axis, said pivoting portion rotatable with respect to said fixed portion about said reclining axis;

said fixed portion having a linkage pin affixed thereto and radially spaced from said reclining axis by a first distance, said linkage pin affixed perpendicularly to said fixed portion, said fixed portion having a stop pin being radially spaced from said reclining axis by a second distance, said first distance greater than said second distance;

said pivoting portion having a lower planar portion extending to an upper planar portion, said lower planar portion being parallel to said upper planar portion, said lower planar portion having an arcuate notch having a center located on said reclining axis, a portion of said stop pin is located in said arcuate notch, said stop pin and said arcuate notch cooperating to constrain said rotation of said pivoting portion with respect to said fixed portion between an upright and a reclined position, said upper planar portion having an armrest receiver portion, said armrest receiver portion having a first wall coplanar with said upper planar portion and having a transverse wall extending therefrom, said transverse wall extending to a second wall, said first wall being parallel to said second wall, said first wall having a keyhole aperture and said second wall having a pin aperture, said keyhole and pin apertures aligned to form an armrest axis;

a rotating cage having a first cage wall having a first cage aperture and a second cage wall having a second cage aperture, said rotating cage having a top cage wall affixed to a front cage wall, said top and front cage walls affixed between said first and said second cage walls, said cage apertures aligned to form a cage axis, said rotating cage being mirror symmetrical about a plane perpendicular to said cage axis and located at a midpoint between said first and second cage walls, said front cage wall having two stop apertures extending therethrough;

a straight elongate link pivotably connected to said linkage pin at a first end and said rotating cage at a second end, said straight elongate link connecting said rotating cage to said fixed portion; and a removable armrest having an elongate portion and an armrest pin extending therefrom, said armrest pin adapted to be received by said cage apertures and said keyhole aperture and said pin aperture to rotatably couple said rotating cage to said pivoting portion, said armrest pin having a stop pin extending perpendicularly therefrom, said stop pin being parallel to said elongate portion, one of said stop apertures adapted to receive said stop pin when said armrest pin is located in said cage apertures and said pin apertures.

2. The seating hinge and armrest assembly of claim 1, wherein said fixed portion having a bottom lateral edge, said bottom lateral edge is parallel with respect to said elongate portion of said armrest.

3. The seating hinge and armrest assembly of claim 1, further comprising a clockspring having an outer end in biased contact with said stop pin and an inner end affixed to said pivoting portion.

4. The seating hinge and armrest assembly of claim 1, further comprising a seat back and a seat bottom, said fixed portion affixed to said seat bottom, said pivoting portion affixed to said seat back.

5. The seating hinge and armrest assembly of claim 1, wherein said first and second cage walls have an arcuate channel extending therethrough, when said rotating cage is coupled to said armrest receiver portion, said arcuate channel aligns with shaft receiving holes located in said first and second walls of said armrest receiver portion, a pin located in said shaft receiving holes and extending through said arcuate channels constrain rotation of said rotating cage with respect to said armrest receiver portion.

6. The seating hinge and armrest assembly of claim 1, said cage axis aligned with said armrest axis when said armrest pin extends through said cage apertures of said rotating cage, said keyhole aperture, and said pin aperture.

7. A seating hinge and armrest assembly adapted to be affixed to a seat having a bottom and a back, said assembly comprising:

a fixed portion connected to a pivoting portion at a pivot point located on a reclining axis, said pivoting portion rotatable with respect to said fixed portion about said reclining axis;

said fixed portion having a linkage pin affixed thereto and radially spaced from said reclining axis by a first distance, said fixed portion having a stop pin being radially spaced from said reclining axis by a second distance, said first distance greater than said second distance;

said pivoting portion having a lower planar portion extending to an upper planar portion, said lower planar portion having an arcuate notch, said stop pin and said arcuate notch cooperating to constrain said rotation of said pivoting portion with respect to said fixed portion, said upper planar portion having an armrest receiver portion, said armrest receiver portion having a first wall extending from said upper planar portion, said first wall of said armrest receiver portion having a transverse wall extending therefrom, said transverse wall extending to a second wall, said first wall being parallel to said second wall, said first wall having a keyhole aperture and said second wall having a pin aperture, said keyhole and pin apertures aligned to form an armrest axis; and a rotating cage having a first cage wall having a first cage aperture and a second cage wall having a second cage aperture, said rotating cage having top and front cage walls affixed between said first and said second cage walls, said cage apertures aligned to form a cage axis, said rotating cage being mirror symmetrical about a plane perpendicular to said cage axis and located at a midpoint between said first and second cage walls, said front cage wall having stop aperture extending therethrough; and an elongate link pivotably connected to said linkage pin at a first end and said rotating cage at a second end, said elongate link connecting said rotating cage to said fixed portion.

8. The seating hinge and armrest assembly of claim 7, further comprising a removable armrest having an elongate portion and an armrest pin extending therefrom, said armrest pin adapted to be received by said cage apertures and said keyhole aperture and said pin aperture to rotatably couple said rotating cage to said pivoting portion, said armrest pin having a stop pin extending perpendicularly therefrom, said stop pin being parallel to said elongate portion, one of said stop apertures adapted to receive said stop pin when said armrest pin is located in said cage apertures and said pin apertures.

9. The seating hinge and armrest assembly of claim 8, wherein said fixed portion having a bottom lateral edge, said bottom lateral edge is parallel with respect to said elongate portion of said armrest.

10. The seating hinge and armrest assembly of claim 7, further comprising a seat back and a seat bottom, said fixed portion affixed to said seat bottom, said pivoting portion affixed to said seat back.

11. The seating hinge and armrest assembly of claim 7, further comprising a clockspring having an outer end in biased contact with said stop pin and an inner end affixed to said pivoting portion.

12. The seating hinge and armrest assembly of claim 7, wherein said first and second cage walls have an arcuate channel extending therethrough, when said rotating cage is coupled to said armrest receiver portion, said arcuate channel aligns with shaft receiving holes located in said first and second walls of said armrest receiver portion, a pin located in said shaft receiving holes and extending through said arcuate channels constrain rotation of said rotating cage with respect to said armrest receiver portion.

13. A seat comprising:
    a seat bottom;
    a seat back;
    a hinge assembly having a fixed portion connected to a pivoting portion at a pivot point located on a reclining axis, said pivoting portion rotatable with respect to said fixed portion about said reclining axis, said fixed portion affixed to said seat bottom, said pivoting portion affixed to said seat back;
    said fixed portion having a linkage pin affixed thereto and radially spaced from said reclining axis by a first distance, said fixed portion having a stop pin being radially spaced from said reclining axis by a second distance, said first distance greater than said second distance;
    said pivoting portion having a lower planar portion extending to an upper planar portion, said lower planar portion having an arcuate notch, said stop pin and said arcuate notch cooperating to constrain said rotation of said pivoting portion with respect to said fixed portion, said upper planar portion having an armrest receiver portion, said armrest receiver portion having a first wall extending from said upper planar portion, said first wall of said armrest receiver portion having a transverse wall extending therefrom, said transverse wall extending to a second wall, said first wall being parallel to said second wall, said first wall having a keyhole aperture and said second wall having a pin aperture, said keyhole and pin apertures aligned to form an armrest axis;
    a rotating cage having a first cage wall having a first cage aperture and a second cage wall having a second cage aperture, said rotating cage having top and front cage walls affixed between said first and said second cage walls, said cage apertures aligned to form a cage axis, said front cage wall having two stop apertures extending therethrough;
    an elongate link pivotably connected to said linkage pin at a first end and said rotating cage at a second end, said elongate link connecting said rotating cage to said fixed portion; and a removable armrest having an elongate portion and an armrest pin extending therefrom, said armrest pin adapted to be received by said cage apertures and said keyhole aperture and said pin aperture to rotatably couple said rotating cage to said pivoting portion, said armrest pin having a stop pin extending perpendicularly therefrom.

14. The seat of claim 13, wherein said fixed portion having a bottom lateral edge, said bottom lateral edge is parallel with respect to said elongate portion of said armrest.

15. The seat of claim 13, further comprising a clockspring having an outer end in biased contact with said stop pin and an inner end affixed to said pivoting portion.

16. The seat of claim 13, further comprising a second hinge assembly affixed between said seat back and said seat bottom to facilitate pivoting of said seat back with respect to said seat bottom.

17. The seat of claim 13, wherein said stop pin being parallel to said elongate portion, one of said stop apertures adapted to receive said stop pin when said armrest pin is located in said cage apertures and said pin apertures.

18. The seat of claim 13, wherein said first and second cage walls have an arcuate channel extending therethrough, when said rotating cage is coupled to said armrest receiver portion, said arcuate channel aligns with shaft receiving holes located in said first and second walls of said armrest receiver portion, a pin located in said shaft receiving holes and extending through said arcuate channels constrain rotation of said rotating cage with respect to said armrest receiver portion.

19. The seat of claim 13, wherein said rotating cage is mirror symmetrical about a plane perpendicular to said cage axis and located at a midpoint between said first and second cage walls.

20. The seat of claim 13, wherein said pivoting portion, said fixed portion, said rotating cage, and said link cooperate to maintain an angle of said armrest with respect to said seat bottom as said pivoting portion rotates with respect to said fixed portion.

* * * * *